G. H. HENKEL.
Cooking Utensil.

No. 203,541.  Patented May 14, 1878.

Witnesses
E. S. Peck
B. E. Peck

Geo. H. Henkel  Inventor
By
H. P. K. Peck
Attorneys

UNITED STATES PATENT OFFICE.

GEORGE H. HENKEL, OF MIDDLETOWN, OHIO, ASSIGNOR OF ONE-HALF HIS RIGHT TO VERMONT HATFIELD, OF SAME PLACE.

IMPROVEMENT IN COOKING UTENSILS.

Specification forming part of Letters Patent No. 203,541, dated May 14, 1878; application filed February 1, 1878.

*To all whom it may concern:*

Be it known that I, GEORGE H. HENKEL, of Middletown, Butler county, Ohio, have invented a new and useful Improvement in Cooking Utensils, of which the following is a full and exact description, reference being had to the accompanying drawings, and to the letters of reference marked thereon.

Figure 1:
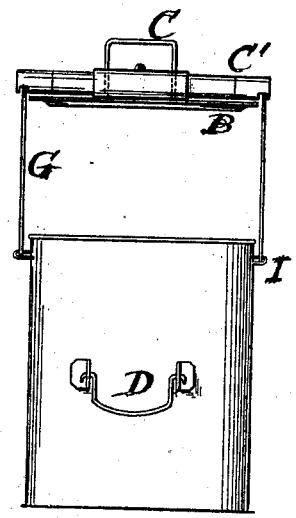
Figure 2:
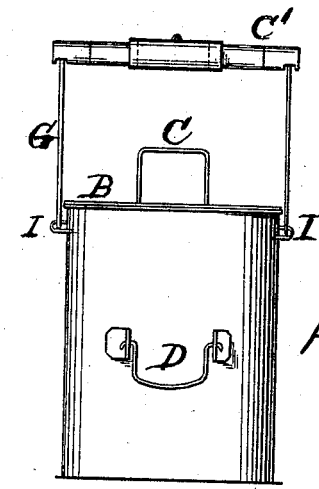
Figures 3, 4:
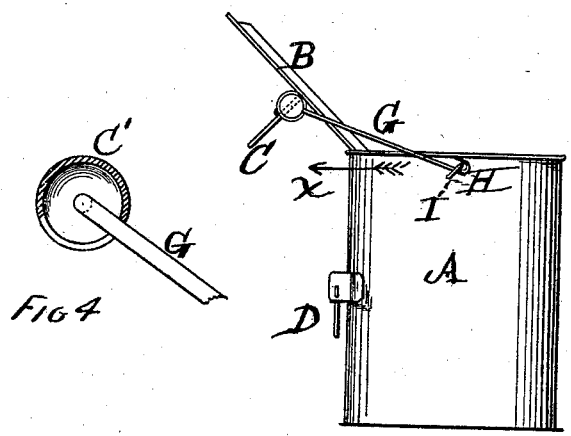
Figure 5:
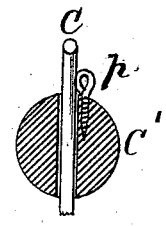

Figure 1 is a side elevation, showing the cover elevated with the bail and handle. Fig. 2 is a side elevation, showing the cover detached from the handle. Fig. 3 represents a side view of the vessel with the handle, bail, and lid turned laterally, the latter resting within the edge of the vessel. Fig. 4 represents one of the ends of the bail-handle and a portion of the bail. Fig. 5 represents a transverse section of the bail-handle and exhibits a portion of the lid-handle.

The object of my invention is to provide a cooking utensil with a bail and cover so connected for use as to protect the hand of the user from the steam which arises from boiling liquids, the cover being so connected to the handle of the bail as to be readily attached and detached, as herein described.

The utensil A is provided with a cover, B, having a handle, C, secured to it permanently. The bail G is made in two parts, each part having a hook, H, at the bottom, and connected with the handle C' by being bent at right angles, so as to work as journals in the ends of the handle C', which are provided with longitudinal holes for the purpose, as shown in Fig. 4.

The ears I, through which the bails G pass, are set obliquely—that is, with one prong above the other, as represented.

D is a small handle attached to the utensil A.

A stud may be fastened centrally to the under side of the cover B, to serve as a stop when the cover is partly withdrawn, and as a support when the cover is tilted to a vertical position outside of the vessel.

When the utensil A is removed from a stove the user may grasp the handle C, raising the cover with the bails, and at the same time the hooks H catch upon the ears I, as represented in Figs. 1 and 2.

The oblique position of the ears permits the cover to be withdrawn laterally to one side only, as indicated by the arrow $x$; and when so withdrawn it may be turned with its handle C to occupy the relation as represented in Fig. 3, so that the condensed steam upon its under side will drip into the vessel. The ends of the handle C' are capped with short tubes having transverse slots of sufficient extent only to permit the cover to occupy the position shown in Fig. 3.

It will be observed that in all the various positions in which it is necessary to manipulate a cooking utensil provided with my improvement the cover serves as a protector of the hand of the user from the steam which rises from cooking vegetables, &c.

To replace the cover upon the vessel when drawn aside, the user, after adjusting it to a horizontal plane, may take hold of handle C, and thrust it laterally over the mouth of the vessel, and the oblique ears will serve as a stop, limiting the lateral movement of bails G, and consequently the cover B, when secured to handle C', as described.

It is apparent that slotted bails may be used with studs for ears and effect the same purpose.

The handle C' is provided with a vertical slot corresponding in size with the handle C, which may be thrust through it, as shown in Figs. 1, 3, and 5. The head of screw $p$ will bear against the wire handle C, which will yield sufficiently to pass the head of the screw, and this serves to retain the parts together until it is desired to separate the cover from handle C', which may be done by holding the cover down while raising the handle C' with the bails G.

By this construction of the parts the cover may be used separately or jointly with the handle C' and bails, as before described.

Having described my invention, I claim—

1. The ears I, obliquely arranged upon the vessel, in combination with a bail, substantially as and for the purpose described.

2. The bails G and handle C', in combination with cover B and obliquely-arranged ears I, substantially as described.

3. The combination of bails G and the ends of the handle C', provided with slotted caps or ferrules for supporting the cover in the position shown in Fig. 3, substantially as described.

Witness my hand this 1st day of January, 1878.

GEO. H. HENKEL.

Witnesses:
H. P. K. PECK,
S. E. PECK.